Figure 1:
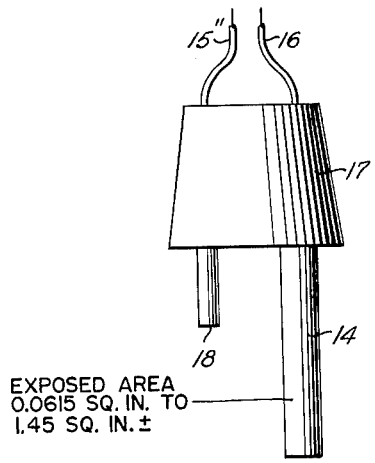

June 28, 1966  D. W. MAURER  3,258,682 pH ELECTRODE ASSEMBLY

Filed May 3, 1962

EXPOSED AREA
0.0615 SQ. IN. TO
1.45 SQ. IN. ±

EXPOSED AREA
0.0035 SQ. IN. TO
0.0155 SQ. IN

CHROMIUM-NICKEL STEEL
CONTAINING NOT SUBSTAN-
TIALLY MORE THAN 2%
MANGANESE.

INVENTOR
Donald W. Maurer

BY Shley & Shley

ATTORNEYS

United States Patent Office 3,258,682
Patented June 28, 1966

3,258,682
pH ELECTRODE ASSEMBLY
Donald W. Maurer, 6930 Patricia, Dallas, Tex.
Filed May 3, 1962, Ser. No. 192,109
6 Claims. (Cl. 324—30)

This invention relates to new and useful improvements in a stable pH electrode assembly.

In the field of determining hydrogen ion concentrations in liquids or solutions by electrical means there are presently available a number of types and styles of electrodes adapted for immersion in the solution under consideration and which function to produce a measurable electrical potential or signal which may be correlated to the hydrogen ion concentration, or the pH, existent within the solution. Many of these electrodes are quite satisfactory for use under certain conditions, but each of these electrodes fails to give satisfactory performance, for one reason or another, when employed under vigorous conditions for a long continued and constant use as a pH electrode. Some fail because of insufficient corrosion resistance, while the majority fail by being incapable of giving a correct or consistent reading when subjected to extremely acid or extremely alkaline solutions. This is particularly true of the well known glass electrodes which furnish erratic and erroneous readings under such conditions. Glass electrodes also fail because of physical damage and because of foam or spray being present at the point of use.

There are many instances in industry in which it is highly desirable to maintain a constant and continuing observation of the pH of a liquid or solution, in many instances a solution which is flowing past a particular point, and for utilizing such observations for the control of automatic equipment functioning to adjust the pH of the solutions to the desired levels. A particular instance of such use is in the control of the pH or acidity of the liquid wastes discharged from a storage battery plant, the acidity of which must be fully and carefully adjusted to prevent undue corrosion and harm to the drainage system or sewerage system into which such wastes are being flowed.

It is, therefore, a principal object of the invention to provide an improved pH electrode assembly which is highly resistant to corrosion, physical abuse, alternate wetting and drying, stray ground currents, foam and spray, and which provides accurate and reliable pH readings over a wide pH range.

A further object of the invention is to provide an improved pH electrode assembly utilizing two electrodes but in which the shape of the electrodes and the spacing therebetween is not critical so long as the electrodes are sufficiently close as to be exposed to a volume of liquid of substantially uniform pH. Otherwise, of course, the readings might be meaningless.

Another object of the invention is to provide an improved pH electrode assembly in which the decreasing of the exposed area of one electrode will increase the speed of response in furnishing pH readings, and in which increasing the area of said electrode will increase the useful life thereof.

Yet another object of the invention is to provide an improved pH electrode assembly of the character described having automatic temperature compensation to maintain uniformity of readings over a wide temperature range.

Other and more specific objects of the invention will be apparent from a reading of the following description.

A construction designed to carry out the invention will be hereinafter described, together with other features of the invention.

Figure 2:
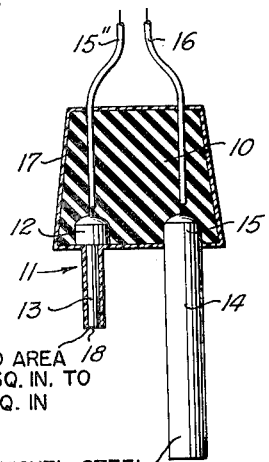
Figure 3:
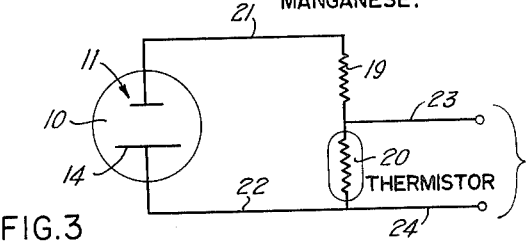
Figure 5:
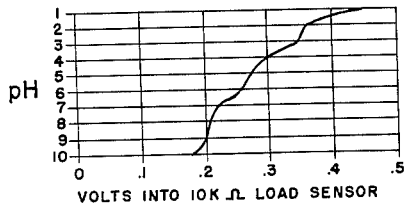
Figure 6:
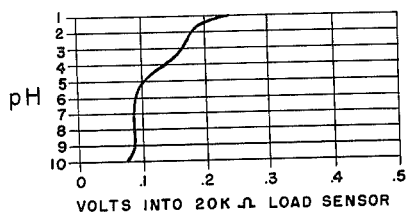
Figure 4:
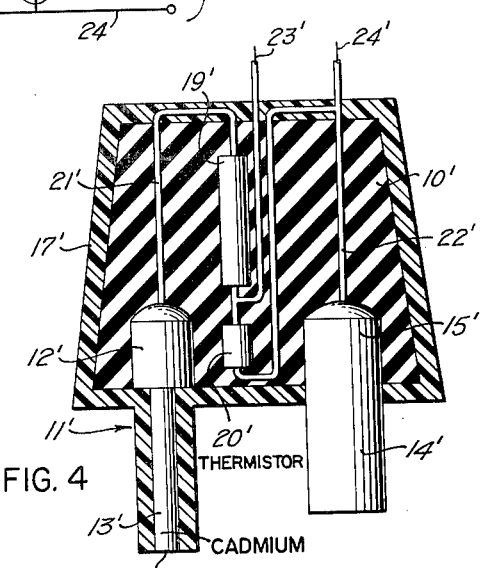

The invention will be more readily understood from a reading of the following specification and by reference to the accompanying drawing, wherein examples of the invention are shown, and wherein:

FIG. 1 is a side elevational view of a pH electrode assembly constructed in accordance with this invention, FIG. 2 is a vertical, sectional view of the assembly shown in FIG. 1, FIG. 3 is a wiring diagram of a modified form of the electrode assembly, FIG. 4 is an enlarged, vertical, sectional view of another modified form of the electrode assembly, FIG. 5 is a graph of the observed output of the pH electrode assembly of FIG. 2, and FIG. 6 is a view similar to FIG. 5 and illustrating a graph of observed output vs. pH of the assembly of FIG. 4.

In the drawings, the numeral 10 designates a supporting body or means desirably formed of a dielectric material but which may be formed of other materials so long as the electrodes to be described are adequately insulated therefrom. As illustrated, the body 10 has a generally frusto-conical shape or configuration, but may be of any size and shape since this is immaterial, and may readily be formed as two or more elements for supporting the electrodes separately. A first electrode 11 has an enlarged head 12 disposed within the body 10 so as to be supported thereby and a depending rod-like shank 13 projecting from the body 10. The second electrode 14 is in the form of an elongate rod having its upper end 15 embedded for support purposes in the body 10, the lower portion of the electrode 14 projecting downwardly from the body 10. Suitable electrical conductors 15″ and 16 extend from the ends of the electrodes 12 and 14, desirably passing upwardly through the body 10. A coating of synthetic resin or other suitable insulating material 17 encases the body 10 on all sides thereof and also the lateral portions of the electrode 11 so that only the lower tip 18 of the latter electrode is exposed.

The electrode 11 or at least the depending shank 13 thereof is formed essentially of commercially pure cadmium, and as employed herein, and in the claims appended hereto, "essentially cadmium" includes cadmium having alloyed therewith a relatively small percentage, such as 5% or less, of another metal. Most desirably, however, the preferred form of the invention utilizes a commercial grade of pure cadmium.

The size and shape of the cadmium electrode 11 is not critical but only the area thereof exposed to the solution being tested. It has been found that this area must vary within the range of 0.0035 to 0.0155 square inch, a smaller area giving a false reading and a larger area causing the electrode assembly to react too slowly. Decreasing the area of the cadmium electrode 11 will incerase the speed of electrode response but will decrease the useful life of the cadmium electrode. It is to be noted, of course, that the shank 13 of the cadmium electrode may corrode or may be eaten away upwardly within its sheath of protective coating material 17 without changing the exposed area at the lower end of the electrode, and also that said sheath may be trimmed away as desired to ensure proper exposure between the lower end of the cadmium electrode and the solution as the electrode is corroded or eaten away upwardly.

The second electrode 14 is formed of a stainless steel of the 300 series group as defined by the American Iron and Steel Institute, these being austenitic chromium-nickel steels containing from a trace to not substantially more than 2% manganese. The compositions of the AISI series 300 austenitic chromium-nickel steels as of 1959 are set forth in Metals Handbook, 8th edition, 1961, volume 1, page 409, published by American Society for Metals, Metals Park, Ohio. According to this publication the AISI series 300 austenitic chromium-nickel steels contain by weight a maximum of 0.03 to 0.25% carbon, a maximum of 2.0% manganese, a maximum of 1.0 to 3.0% silicon, 16 to 26% chromium, 6 to 22% nickel, and traces of phosphorous and sulfur as a maximum, the remainder being iron. Specifically, AISI 316 stainless steel contains by weight 0.08% maximum carbon, 2.0% maximum manganese, 1.0% maximum silicon, 16 to 18% chromium, 10 to 14% nickel, 2.0 to 3.0% molybdenum and traces of phosphorous and sulfur, the remainder being iron. Also, specifically, AISI 303 stainless steel contains by weight 0.15% maximum carbon, 2.0% maximum manganese, 1.0% maximum silicon, 17 to 19% chromium, 8 to 10% nickel, and traces of phosphorous and sulfur, the remainder being iron, all the foregoing compositions being taken from Metals Handbook, supra. There are similar steels known as the 200 series steels, as defined by the American Iron and Steel Institute, which contain 5–10% manganese, and it has been found that a 200 series steel is not suitable for forming the electrode 14. Thus, the electrode may be properly defined herein and in the claims appended hereto as an austenitic chromium-nickel steel containing from a trace to not appreciably or substantially more than 2% manganese. The shape of the electrode 14 is not critical nor is its spacing from the first electrode of a determinative nature so long as the two electrodes are sufficiently close as to be immersed in a more or less homogeneous body of liquid. In a flowing stream of liquid, if one electrode was possibly 10 or 15 feet from the other electrode, it might well be that an erroneous reading might be obtained due to the exposure of the two electrodes to liquids of differing nature. Of course, it is usually most convenient to space the electrodes apart a fraction of an inch or not more than several inches, but again, this is not critical. The exposed area of the second electrode 14 is of considerable importance, however, and should be within the range of from not appreciably less than 0.0615 square inch to about 1.45 square inches. Even at 0.0615 square inch of area exposure, the assembly will not accurately read a pH above about 3, whereas if too large an area is exposed, the voltage output observable from the assembly is disadvantageously affected.

Utilizing an AISI 316 chromium-nickel steel to form the electrode 14, the optimum area for exposure to the liquid has been found to be 1.45 square inches, an appreciably larger area causing difficulties in obtaining true tracking characteristics on a full pH scale of 1–10, and a reduction much below this area causing difficulties in tracking characteristics in the higher range pH 5 to pH 10. On the other hand, utilizing an AISI 303 chromium-nickel steel an optimum exposed area of 0.45 square inch was found to exist. Further, it was found that the AISI 303 chromium-nickel steel, applied as illustrated in FIGS. 3 and 4, provides accurate readings over a wider temperature range than the AISI 316 chromium-nickel steel. Thus, it is apparent that for any particular chromium-nickel steel an optimum area and a useable range of areas may be empirically determined, but it is further noted that under specialized conditions the areas of both electrodes may be more or less disregarded. It is also pointed out that changing the area of the first or cadmium electrode which is exposed to the solution does not significantly affect the influence of the area of the second electrode insofar as accuracy of pH determinations is concerned.

In conjunction with the range of areas for the chromium-nickel steel electrode 14 recited hereinabove, it is entirely feasible in the automatic control of a flowing volume of liquid to utilize a first electrode assembly in which minimal area of the second electrode is exposed for determination of pH up to about 3. This indication may well be employed for automatic treatment or pretreatment of the liquid, and the second electrode assembly, sensitive to the entire pH range utilized at a point downstream of the first electrode for further and final adjustment of the pH through automatic injection apparatus for alkaline materials. It is also noted in connection with the chromium-nickel steel electrode that the more corrosion resistant the chromium-nickel steel in use may be, the larger the area of the electrode that should be exposed for obtaining full scale pH sensitivity.

It is desirable that these electrode assemblies retain their accuracy over an appreciable temperature range since the liquids to which they are exposed may vary in temperature from time to time. A circuit for achieving this result is illustrated in FIG. 3 in which a resistor 19 which may have a value of 5,000 ohms and a thermistor 20 which may have a value of 10,000 ohms are connected in series between the electrodes 11 and 14 by means of conductors 21 and 22. One output conductor 23 is then connected to the juncture between the resistor 19 and the thermistor 20, and the other output conductor 24 connected directly to the conductor 22 leading to the electrode 14. A modification of this assembly is shown structurally in FIG. 4 in which the resistor and thermistor 19' and 20' respectively, are carried and enclosed within the body 10', the assembly receiving a coating 17' similar to the coating 17 and having the output conductors 23' and 24' extending therefrom. In this modification, however, the second or chromium-nickel steel electrode 14' exposes a somewhat reduced area as compared to that of the electrode 14, this modification of FIG. 4 illustrating the use of AISI 303 chromium-nickel steel for the second electrode. Otherwise, the elements appearing in FIG. 4 carry the same numerals as those of FIG. 2 with a prime added thereto.

Thus, either the electrode assemblies of FIG. 2 or of FIG. 4 may be modified externally as shown in FIG. 3 or internally as shown in FIG. 4 for accomplishing uniform response over a given temperature range so as to provide essentially the same electric signal for a given pH value over a temperature range of for instance 40° to 100° F. Otherwise, the assembly as illustrated in FIG. 2 without temperature compensation will give essentially the same electric output signal for a given pH value over a range of from 60° to 100° F.

FIG. 5 illustrates the typical output curve observed from utilization of the electrode assembly shown in FIG. 2, and FIG. 6 illustrates such a curve for the modification of FIG. 4, both curves plotting volts against the pH being observed.

The output of the pH electrode assemblies disclosed herein is a direct current signal involving both voltage and current which may be read directly by a microammeter, a suitable meter linked to the output conductor through a conventional bridge, or any of many other types of suitable and conventional electrical measuring apparatus, the readings of which may be translated to pH readings, or which may be conventionally calibrated to give a direct pH reading together with or separate from a continuous pH recording and suitable actuation of conventional automatic control equipment for regulation of the observed pH.

Through adjustment of the exposed areas of the electrodes as is well within the ability of those skilled in this art, as well as in variation of the alloy utilized for the second electrode, typical pH observance curves may be obtained reflecting comparative sensitivity over the entire pH range or, if desired, exhibiting relatively flat plateaus in selected pH areas where maximum sensitivity is desired such as between pH 3 and pH 5 as illustrated in FIG. 6. If conventional and well known amplification systems are employed between the output of the electrode assembly and the point of observation, the characteristics of such amplification and the components employed therein may be varied in well known manners to obtain relatively linear readings of the existent pH over the entire range, or to create restricted areas of increased sensitivity in selected portions of the pH range by well known electrical and electronic expedients.

Returning to the first or cadmium electrode, it has been found that the shank 13 thereof has an optimum diameter of 0.10 inch or an optimum exposed area of approximately 0.00785 square inch. This is subject, of course, to the above noted useable range of exposed areas of 0.0035 to 0.0155 square inch which correspond to diameters of the shank 13 of 0.065 to 0.14 inch respectively.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A pH electrode assembly including, a first electrode formed essentially of cadmium and having an exposed area of 0.0035 to 0.0155 square inch, a second electrode formed of an austenitic chromium-nickel steel containing from a trace to not substantially more than 2% manganese and having an exposed area of 0.0615 to 1.45 square inches, and means for supporting the first and second electrodes.

2. A pH electrode assembly including, a first electrode formed essentially of cadmium and having an exposed area of 0.0035 to 0.0155 square inch, a second electrode formed of an austenitic chromium-nickel steel containing from a trace to not substantially more than 2% manganese and having an exposed area of 0.0615 to 0.45 square inch, and means for supporting the first and second electrodes.

3. A pH electrode assembly including, a first electrode formed essentially of cadmium and having an exposed area of approximately 0.00785 square inch, a second electrode formed of an austenitic chromium-nickel steel containing from a trace to not substantially more than 2% manganese and having an exposed area of approximately 1.45 square inches, and means for supporting the first and second electrodes.

4. A pH electrode assembly including, a first electrode formed essentially of cadmium and having an exposed area of 0.0035 to 0.0155 square inch, a second electrode formed of an austenitic chromium-nickel steel containing from a trace to not substantially more than 2% manganese and having an exposed area of 0.0615 to 1.45 square inches, a resistor, a thermistor, the resistor and thermistor being connected in series between the two electrodes, a first output lead extending from one of the electrodes, a second output lead extending from the juncture between the resistor and the thermistor, and means for supporting the first and second electrodes.

5. A pH electrode assembly including, a first electrode formed essentially of cadmium and having an exposed area of 0.0035 to 0.0155 square inch, a second electrode formed of an austenitic chromium-nickel steel containing from a trace to not substantially more than 2% manganese and having an exposed area of 0.0615 to 1.45 square inches, a resistor, a thermistor, the resistor and the thermistor being connected in series between the two electrodes, a first output lead extending from one of the electrodes, a second output lead extending from the juncture between the resistor and the thermistor, and means for supporting the two electrodes, the resistor and the thermistor in a unitary assembly.

6. A pH electrode assembly including, a first electrode formed essentially of cadmium and having an exposed area of 0.0035 to 0.0155 square inch, a second electrode formed of an austenitic chromium-nickel steel containing from a trace to not substantially more than 2% manganese and having an exposed area of 0.0615 to 1.45 square inches, a 5,000 ohm resistor, a 10,000 ohm thermistor, the resistor and thermistor being connected in series between the two electrodes, a first output lead extending from one of the electrodes, a second output lead extending from the juncture between the resistor and the thermistor, and means for supporting the first and second electrodes.

References Cited by the Examiner
UNITED STATES PATENTS

| | | | |
|---|---|---|---|
| 1,089,030 | 3/1914 | Angell | 324—30 |
| 1,479,087 | 1/1924 | Rice | 324—30 |
| 2,013,379 | 9/1935 | Drumm et al. | 136—31 |
| 2,805,198 | 9/1957 | Robinson et al. | 204—293 X |
| 2,922,105 | 1/1960 | Estelle | 324—30 |
| 2,994,730 | 8/1961 | Freas | 136—100 |

WALTER L. CARLSON, *Primary Examiner.*

FREDERICK M. STRADER, *Examiner.*

C. F. ROBERTS, *Assistant Examiner.*